C. A. ERDLEY.
TRAP.
APPLICATION FILED AUG. 26, 1915.

1,168,252.

Patented Jan. 11, 1916.

Witnesses
Fenton S. Belt
J. W. Sherwood

Inventor
C. A. Erdley
By Franklin N. Hough
Attorney

THE COLUMBIA PLANOGRAPH CO., WASHINGTON, D. C.

UNITED STATES PATENT OFFICE.

CLARENCE A. ERDLEY, OF MIFFLINBURG, PENNSYLVANIA.

TRAP.

1,168,252. Specification of Letters Patent. Patented Jan. 11, 1916.

Application filed August 26, 1915. Serial No. 47,509.

*To all whom it may concern:*

Be it known that I, CLARENCE A. ERDLEY, a citizen of the United States, residing at Mifflinburg, in the county of Union and State of Pennsylvania, have invented certain new and useful Improvements in Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in traps for catching mice, rats and animals of various kinds and consists essentially in the provision of a transparent receptacle having a funnel-shaped top through which the animal is adapted to enter the interior of the receptacle and be prevented from making exit.

The invention consists further in the provision of various details of construction, combinations and arrangements of parts which will be hereinafter fully described, shown in the accompanying drawings and then specifically defined in the appended claims.

Figure 1:
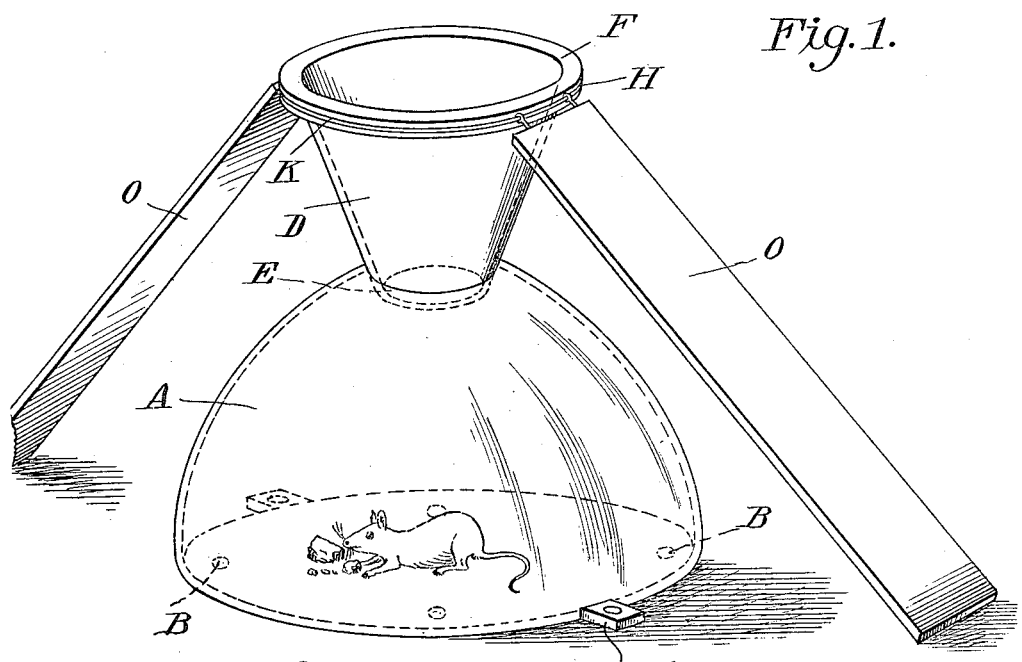
Figure 2:
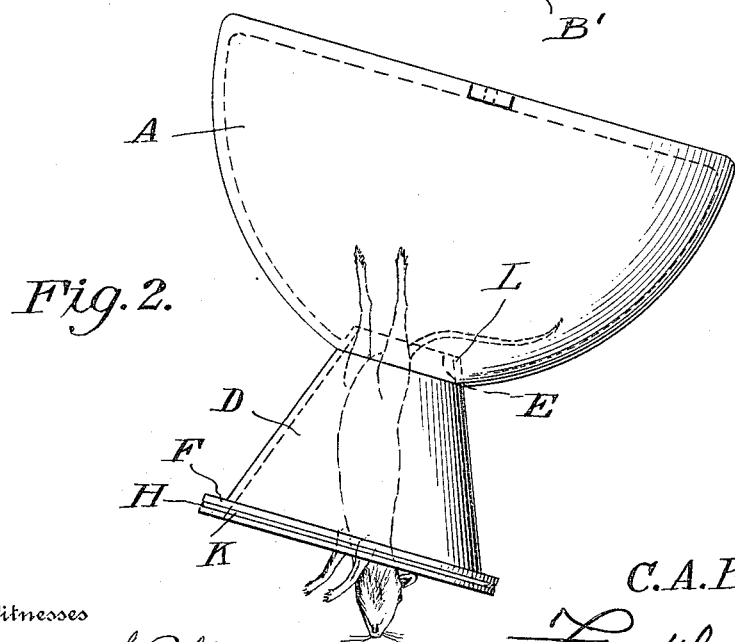

I illustrate my invention in the accompanying drawings, in which:

Figure 1 is a perspective view of the trap, and Fig. 2 is an inverted side view.

Reference now being had to the details of the drawings by letter, A designates the body portion of the receptacle, made preferably of transparent glass and which may be of any shape, either circular-outlined as shown in the drawings or angular, if desired, and is provided with openings B in the bottom thereof, whereby any water may make exit. The body portion of the trap has laterally projecting lugs B′, serving as means for fastening the device to an object. The upper portion of the receptacle is convexed and has a funnel D communicating with an opening E therein, said funnel having a flange F about its upper end which is circumferentially grooved as at H and a wire, designated by letter K, is passed about said groove and is adapted to engage the upper end of a bridge or board O, while the lower end of the latter is designed to rest upon a fixed object. It will be noted, upon reference to the drawings, that a flange L projects within the body portion A about the opening in the apex thereof, said flange being designed to prevent the escape of the animal that has entered the trap through the opening.

The bait to induce the animals to go into the trap is placed within the body portion of the trap and the animals are attracted by the scent of the bait to pass up the bridge or board and, in order to get in the trap, will have to go through the funnel-shaped top and the opening into the body portion beneath and, when once within the latter, will find it impossible to make exit. After an animal has been trapped, the walls of the trap being transparent will tend to attract other animals into the interior of the trap not only by the bait but by seeing the animal within the transparent receptacle. The trapped animals may be removed from the trap, either alive or after being drowned, by simply inverting the same.

What I claim to be new is:—

1. In a trap of the character described, a body portion having a perforated bottom provided with laterally extending apertured lugs, an opening in the upper part of the body portion, a funnel extending through the opening to a point within the body portion and its upper end provided with an outwardly extending flange, and a bridge connected to the outer edge of the funnel.

2. In a trap of the character described, an oval body portion having a perforated bottom, the outer edge of which is provided with laterally extended apertured lugs and at its apex provided with an opening, in combination with a funnel, the lower end of which projects through the opening in the body portion and is extended to a point within the chamber, the enlarged end of the funnel being provided with an outwardly extending flange, the outer edge of which is provided with a peripheral groove, a wire seated within the latter, and a bridge, having hinged connection with the wire within the groove.

In testimony whereof I hereunto affix my signature in presence of two witnesses.

CLARENCE A. ERDLEY.

Witnesses:
S. W. JOHNSTON,
JOHN A. BEARD.

Copies of this patent may be obtained for five cents each, by addressing the "Commissioner of Patents, Washington, D. C."